(12) United States Patent
MacKenzie et al.

(10) Patent No.: US 8,902,077 B2
(45) Date of Patent: Dec. 2, 2014

(54) SUBSEA COMMUNICATION SYSTEM AND TECHNIQUE

(75) Inventors: Roderick MacKenzie, Sugar Land, TX (US); John A. Kerr, Sugar Land, TX (US); Alan J. Johnston, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1015 days.

(21) Appl. No.: 11/425,939

(22) Filed: Jun. 22, 2006

(65) Prior Publication Data

US 2007/0000667 A1 Jan. 4, 2007

Related U.S. Application Data

(62) Division of application No. 10/127,522, filed on Apr. 22, 2002, now Pat. No. 7,123,162.

(60) Provisional application No. 60/285,767, filed on Apr. 23, 2001.

(51) Int. Cl.
*G01V 3/00* (2006.01)

(52) U.S. Cl.
USPC .......... 340/853.3; 367/82; 166/340; 166/352; 166/367

(58) Field of Classification Search
USPC ............ 340/854.7, 85.33; 166/337, 340, 341, 166/352, 342, 367–368; 367/82, 83
See application file for complete search history.

(56) References Cited

U.S. PATENT DOCUMENTS

| | | | |
|---|---|---|---|
| 3,551,890 A | | 12/1970 | Silverman |
| 3,967,647 A | * | 7/1976 | Young ...................... 137/614.11 |
| 4,095,421 A | * | 6/1978 | Silcox .............................. 60/398 |
| 4,147,222 A | * | 4/1979 | Patten et al. ....................... 175/9 |
| 4,206,810 A | | 6/1980 | Blackman |
| 4,253,525 A | * | 3/1981 | Young ............................ 166/336 |
| 4,273,212 A | * | 6/1981 | Dorr et al. ....................... 181/102 |
| 4,375,239 A | * | 3/1983 | Barrington et al. ............ 166/336 |
| 5,163,029 A | * | 11/1992 | Bryant et al. ..................... 367/83 |
| 5,657,823 A | * | 8/1997 | Kogure et al. ................. 166/340 |
| 6,018,501 A | * | 1/2000 | Smith et al. .................... 367/134 |
| 6,172,614 B1 | * | 1/2001 | Robison et al. ............. 340/853.3 |
| 6,218,959 B1 | * | 4/2001 | Smith ......................... 340/853.7 |
| 6,257,549 B1 | * | 7/2001 | Hopper ..................... 251/129.11 |
| 6,293,344 B1 | | 9/2001 | Nixon et al. |

(Continued)

FOREIGN PATENT DOCUMENTS

| | | |
|---|---|---|
| EP | 0922836 B1 | 3/2006 |
| GB | 1547848 A | 6/1979 |

(Continued)

OTHER PUBLICATIONS

Simrad Hydroacoustic Link Technical Specification, 213-SPE-D270-G655, published Nov. 10, 1983, 5 pages.

(Continued)

*Primary Examiner* — Albert Wong
(74) *Attorney, Agent, or Firm* — Jeffrey R. Peterson; Brandon S. Clark

(57) ABSTRACT

A subsea communication system is used to communicate between a position that is proximal to a surface of the sea and an apparatus of the seabed. The subsea communication system includes an umbilicalless communication system.

16 Claims, 10 Drawing Sheets

(56) References Cited

U.S. PATENT DOCUMENTS

| | | | |
|---|---|---|---|
| 6,628,206 B1 * | 9/2003 | Soulier | 340/854.4 |
| 6,763,889 B2 * | 7/2004 | Rytlewski et al. | 166/338 |
| 7,295,491 B2 * | 11/2007 | Carstensen | 367/83 |

FOREIGN PATENT DOCUMENTS

| | | |
|---|---|---|
| GB | 2081776 A | 2/1982 |
| GB | 2259832 A | 3/1993 |
| GB | 2299915 A | 10/1996 |
| WO | WO0189014 | 11/2001 |

OTHER PUBLICATIONS

Kongsberg Simrad Htl Pamphlet, "Hydroacoustic telemetry links," 855-130407 Rev.B, Kongsberg Maritime As, Norway, 4 pages.

Simrad HPR-309A, Acoustic Control and Navigation System, Operators Manual, UKOLS Project, Horten, Oct. 1986, Reg. No. 859-081906, 36 pages.

Examination Report issued Feb. 2, 2005 for GB Application No. GB0209130.4, 4 pages.

* cited by examiner

SUBSEA COMMUNICATION SYSTEM AND TECHNIQUE

This application is a divisional of U.S. patent application Ser. No. 10/127,522, entitled, "SUBSEA COMMUNICATION SYSTEM AND TECHNIQUE," which was filed on Apr. 22, 2002, and is hereby incorporated by reference in its entirety.

BACKGROUND

The invention generally relates to a subsea communication system and technique.

In a subsea well field, several types of subsea equipment may be electrically operated or actuated from the sea surface. For example, such equipment may include certain wireline tools and remote well telemetry equipment that is located near the sea floor.

Typically, for purposes of controlling subsea equipment, an umbilical cord extends from a surface platform (a vessel, for example) to a location near the sea floor. In this manner, the umbilical cord may be connected to a hydraulic power unit at the platform for purposes of communicating hydraulic stimuli to the subsea equipment to control the equipment. The umbilical cord may also communicate chemicals to a location near the sea floor for purposes of controlling chemical injection into a particular subsea well, for example. A difficulty with such an arrangement is the cost and complexity relating to extending the umbilical cord to the subsea equipment.

Thus, there is a continuing need for an arrangement that addresses one or more of the problems that are stated above as well as additional problems that are not stated above.

SUMMARY

In an embodiment of the invention, a subsea communication system for communicating between a position proximate to the surface of the sea and an apparatus at the seabed includes an umbilicalless communication system.

Advantages and other features of the invention will become apparent from the following drawing, description and claims.

DETAILED DESCRIPTION

Figure 1:
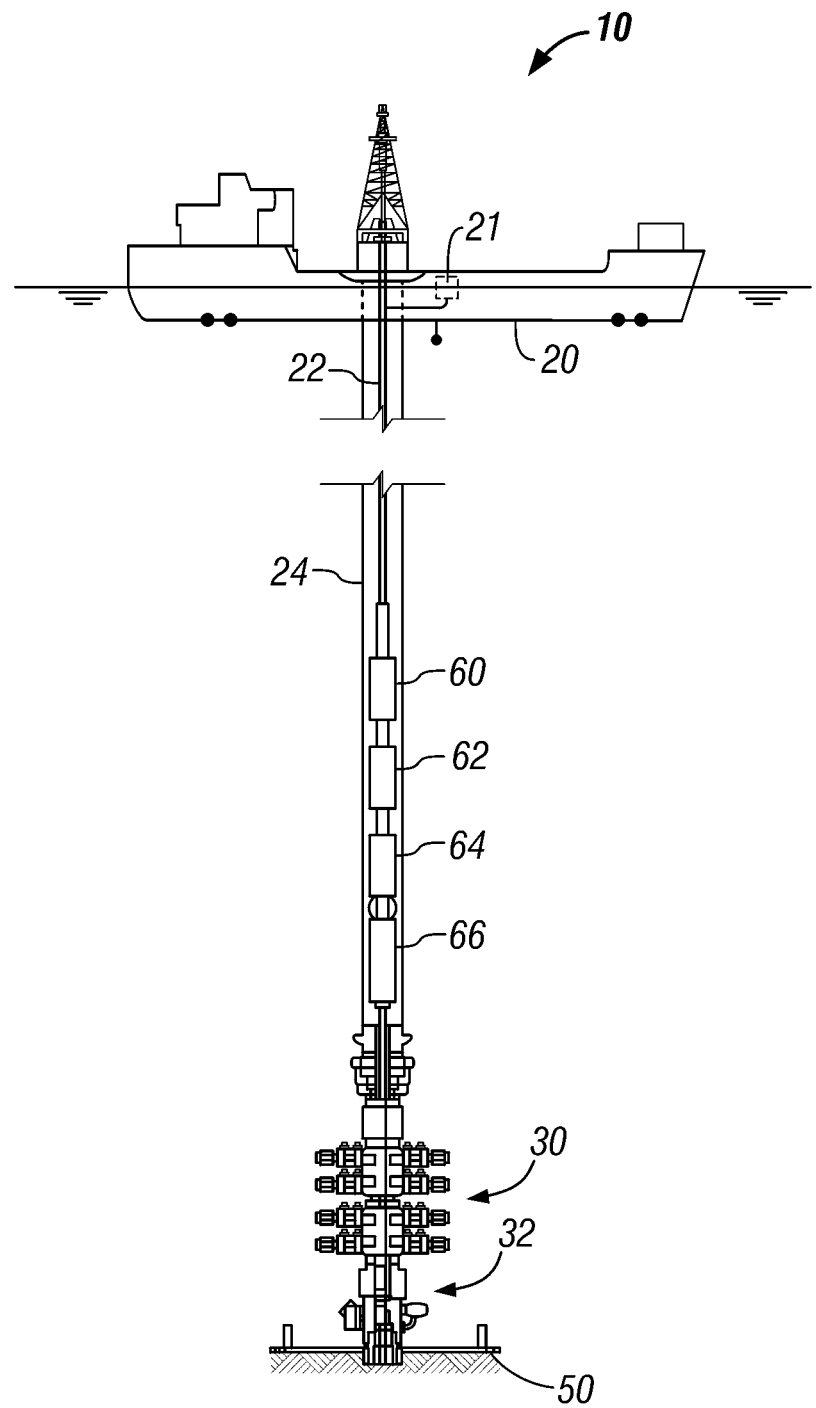
FIG. 1 is a schematic diagram of a subsea well system according to an embodiment of the invention.

Referring to FIG. 1, a subsea well system 10 in accordance with the invention includes a sea surface platform, such as a surface vessel 20, which includes subsea communication circuitry 21. The circuitry 21 may be controlled by a computer (for example) on board the vessel 20 for purposes of communicating with subsea equipment via an umbilicalless subsea communication system, described below. This subsea equipment is located in proximity to a seabed, or sea floor 50. As its name implies, the umbilicalless communication system does not include an umbilical cord (a component of a typical subsea communication system) for purposes of communicating with and controlling the subsea equipment.

More particularly, in some embodiments of the invention the system 10 includes a marine riser 24 that extends downwardly from the vessel 20 to a subsea tree 30 that, in turn, is connected to a subsea wellhead 32. The tree 30 includes a blowout preventer (BOP) and other features to control communication with the corresponding subsea well. Tools contained on a production tubing, or landing string 22, such as valves and a latch, control the connection and disconnection of the marine riser 24 and landing string 22 to the tree 30. In this manner, these tools provide emergency disconnection from the tree 30, as well as prevent well fluid from flowing from the well or the landing string 22 during the disconnection and connection of the marine riser 24 and landing string 22 to the tree 30. A more detailed example of the well tree 30, landing string 22 and associated tools may be found in, for example, Nixon, U.S. Pat. No. 6,293,344, granted on Sep. 25, 2001.

Because an umbilical cord is not provided between the well tree 30 and the vessel 20, the system 10 includes a hydraulic power unit, an electrical generation unit and a chemical injection unit that are all located in proximity to the sea floor 50, in some embodiments of the invention. The hydraulic power unit is controlled via the communication that occurs over the umbilicalless communication system. Furthermore, the umbilicalless communication system may also be used to communicate status signals, indicating the status of various pieces of downhole equipment, from the sea floor 50 to the sea surface.

More specifically, in some embodiments of the invention, near the subsea end of the landing string 22, the landing string 22 includes an umbilicalless communication unit 60 that, as described below, communicates with the circuitry 21 of the vessel 20 without using an umbilical cord. As described below, the umbilicalless communication unit 60 may use acoustic, optical or electromagnetic transmission techniques to communicate with the circuitry 21, depending on the particular embodiment of the invention. Near the communication unit 60, the landing string 22 may also include a hydraulic power unit 62 that responds to commands that are communicated over the umbilicalless communication system for purposes of controlling one or more fluid pumps to generate hydraulic stimuli to control various subsea tools. These tools may be located in the landing string 22, tree 30 or may be otherwise be located in proximity to the sea floor 50 and tree 30.

The landing string 22 also includes an energy source 64, such as a fuel cell, for example, that delivers the needed electrical power to perform various subsea applications, such as providing power to the hydraulic power unit 62. Such a fuel cell is described in PCT Application Number WO 01/89014 A1, filed on May 16, 2001. Additionally, in some embodiments of the invention, the landing string 22 may include a chemical injection unit for purposes of introducing various chemicals into the subsea well, as controlled from commands that are communicated through the umbilicalless communication system.

The communication unit 60 may communicate with the circuitry 21 for purposes of receiving instructions relating to control of the subsea well, as well as transmitting indications of various parameters to the vessel 20. In this manner, in response to a command from the vessel 20, the unit 60 actuates the necessary pumps in the hydraulic unit 62 to control the valves as instructed. The power for the communication unit 60 is provided by the stored energy source 64. Furthermore, a particular command may instruct the communication unit 60 to inject certain chemicals into the well. Therefore, in response to such an instruction, the communication unit 60 interacts with the chemical injection unit 66 accordingly.

As depicted in FIG. 1, in some embodiments of the invention, the communication unit 60, hydraulic power unit 62, energy source 64 and chemical injection unit 66 are attached to the landing string 22. In this manner, each of these units have a central passageway to allow well fluids to pass through the units and through the central passageway of landing string 22 to the surface of the well. It is noted that, in some embodiments of the invention, one or more of the units may be connected differently or located in another position. For example, one of the units may be located on the sea floor 50. As another example, one or more of the units may be attached to the outside of the marine riser 24. Thus, the arrangement that is depicted in FIG. 1 is merely an example of one particular embodiment of the invention, as many other variations and embodiments of the invention are possible.

Figure 2:
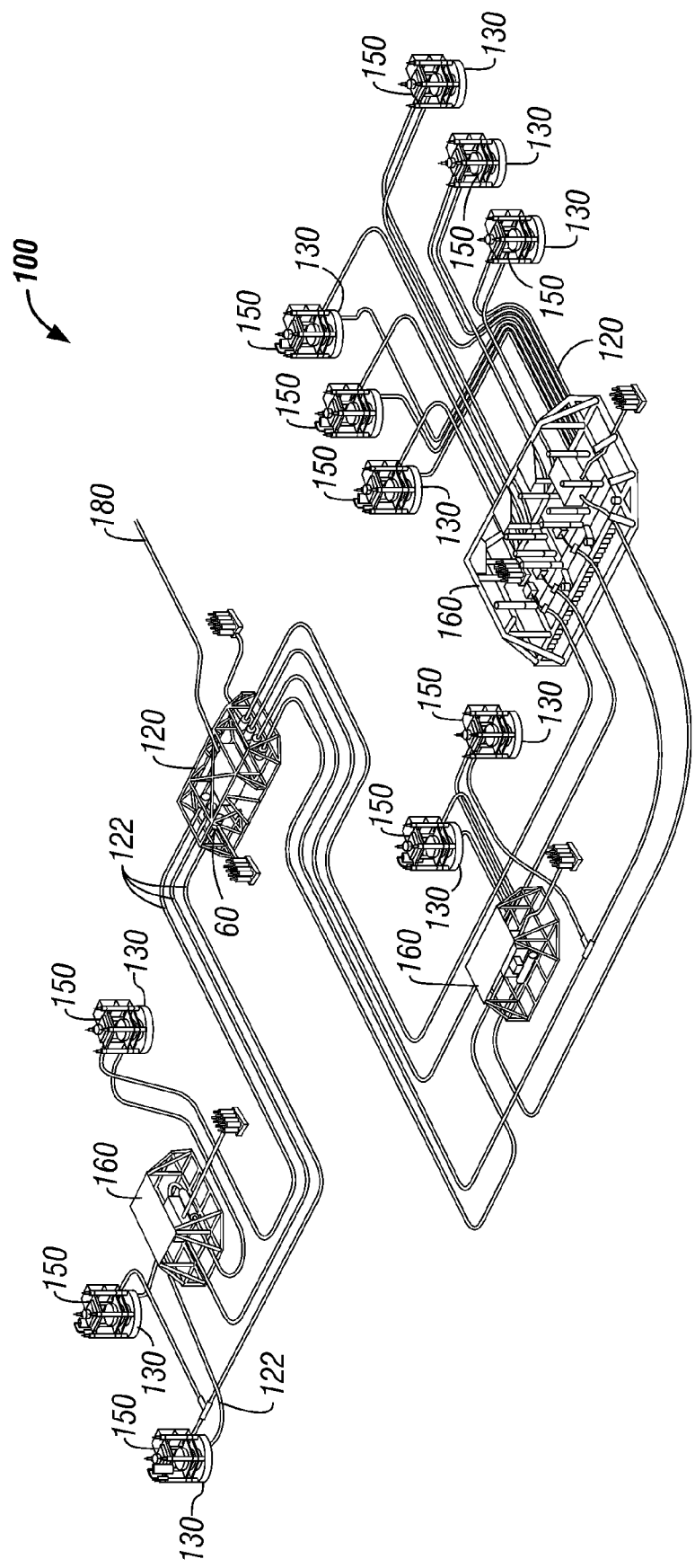
FIG. 2 is a schematic diagram of a subsea well field according to an embodiment of the invention.

FIG. 1 depicts an arrangement for a single marine riser 24 that is connected to a single subsea well. However, other subsea arrangements may employ the umbilicalless communication according to other embodiments of the invention. For example, referring to FIG. 2, a subsea field 100 may include multiple wellheads 130 that are located on the sea floor 50. In this manner, each of the wellheads 130 is attached to a well tree 150 that, in turn, is coupled (via production pipe, control lines and possibly electrical lines) to a corresponding production manifold 160. Each of the production manifolds 160 serves as a distribution unit for oil/gas production, water injection, chemical injection, electrical power, hydraulic power and communications, as examples. The production manifolds 160 also control and power the individual subsea wellheads 130, trees 150 and the associated equipment to facilitate production delivery to the surface for processing.

In this manner, in some embodiments of the invention, the production manifolds 160 are connected to a subsea processing facility 120. The subsea processing facility 120 facilitates multiphase boosting, multiphase flow metering, subsea separation and water injection, as just a few examples. Furthermore, in some embodiments of the invention, the subsea processing facility 120 may include one or more of the units 60, 62 and 64. For example, the communication unit 60 of FIG. 1 may be located in the subsea processing facility 120 and serve as the central communication point for the entire field 100. Alternatively, in some embodiments of the invention, each well tree 150 may include one or more of the units 60. For example, in some embodiments of the invention, each well tree 150 may include a communication unit 60 for purposes of independently communicating with the circuitry 21 of the surface vessel 20. Other variations and arrangements are possible.

For purposes of simplifying the following discussion, the single well arrangement that is generally depicted in FIG. 1 is used. Although it is understood that the communication techniques discussed herein apply not only to communication to subsea equipment that is associated with a single well but to communication with subsea equipment that is associated with multiple wells.

Figure 3:
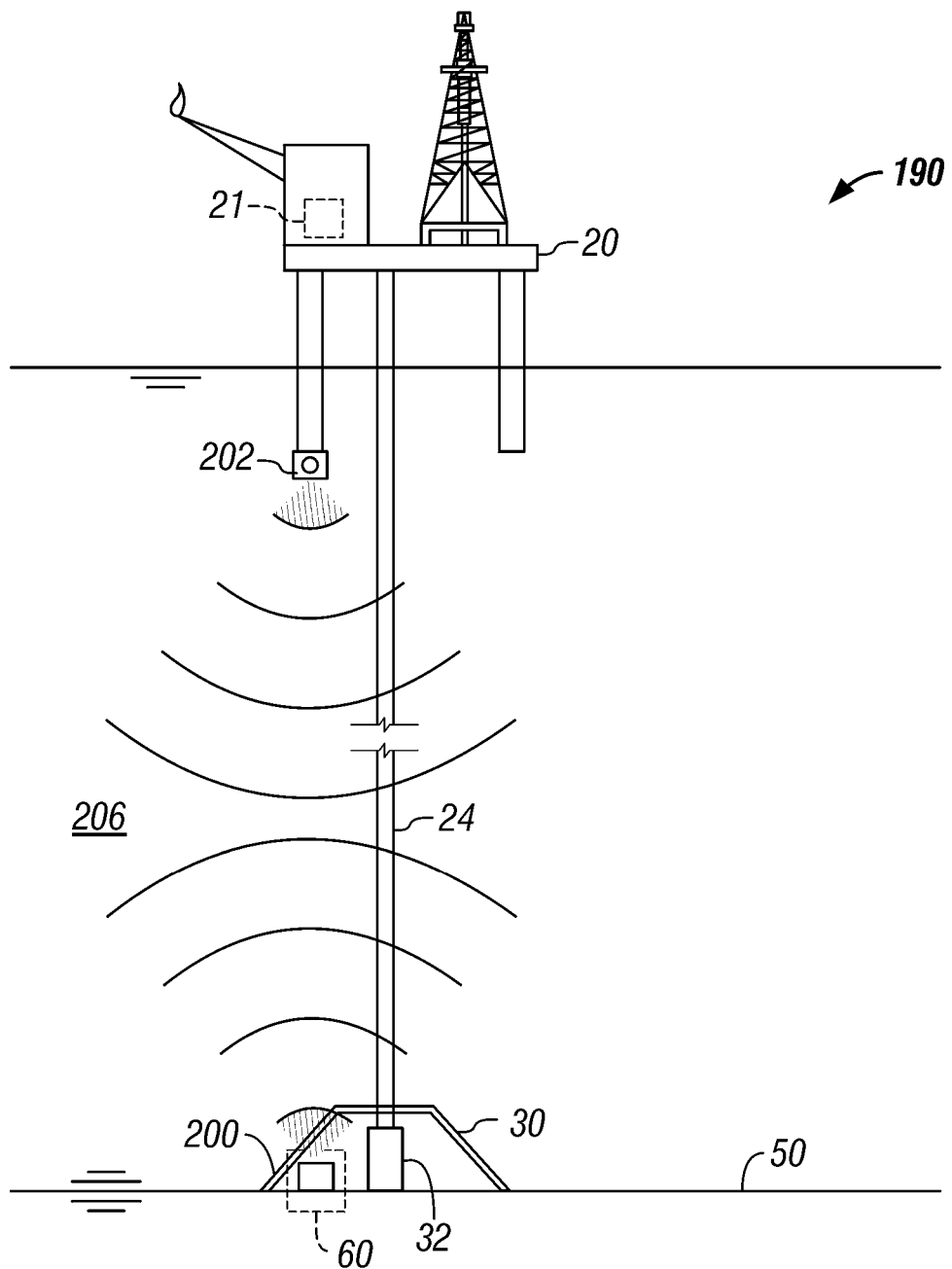
FIGS. 3, 4, 5 and 6 depict acoustic communication systems between subsea equipment and a surface platform according to different embodiments of the invention.

FIG. 3 depicts an acoustic subsea communication system 190 in accordance with an embodiment of the invention. In the system 190, the communication unit 60 includes an acoustic modem 200 that uses open sea acoustic communication to communicate with an acoustic modem 202 that is located at the surface of the sea and is electrically connected to the circuitry 21. In this manner, for purposes of transmission, the acoustic modem 200 generates sound waves that propagate through the sea from the sea floor 50 to the sea surface. Likewise, for purposes of transmitting from the sea surface to the sea floor 50, the modem 202 generates sound waves. Each modem 200, 202 is bi-directional, thereby having the capability to both detect and transmit acoustic signals.

Figure 4:
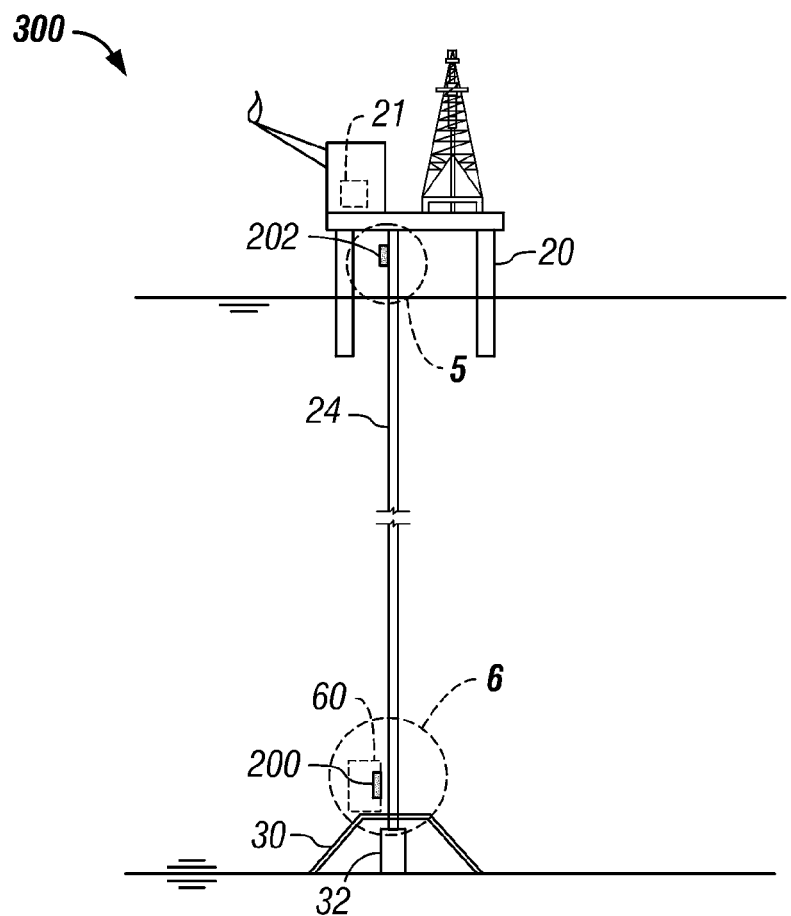

Referring to FIG. 4, in another acoustic communication system 300 in accordance with an embodiment of the invention, tubing fluid (i.e., not seawater) is used as the medium through which sound waves of the umbilicalless communication system propagate. In this manner, in the system 300, the acoustic modem 202 is located in proximity to the marine riser 24 for purposes of communicating acoustic waves to fluid within the marine riser 24 and detecting acoustic waves that propagate through the fluid of the marine riser 24. Similarly, the subsea modem 200 also is arranged in proximity to the marine riser 24 for purposes of communicating acoustic waves to and from the fluid within the marine riser 24. The actual tubing fluid through which the modems 200 and 202 communicate depends on the particular embodiment of the invention.

Figure 5:
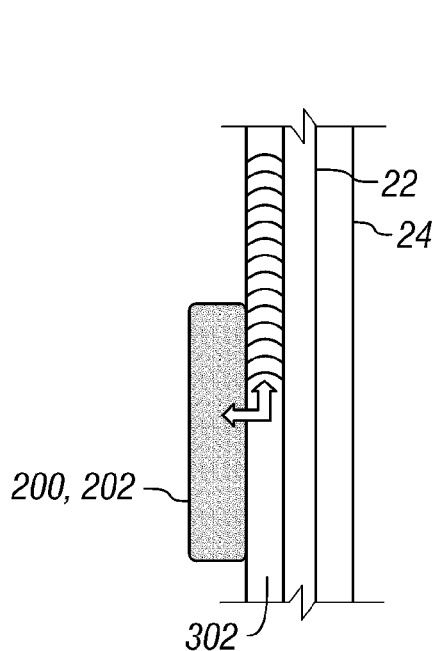

For example, referring to FIG. 5, in some embodiments of the invention, the modem 200, 202 is connected to the outside of the marine riser 24. Due to this arrangement, the modems 200 and 202 communicate through fluid in an annulus 302 that is defined in the space between the outside surface of the landing string 22 and the interior surface of the marine riser 24. In this manner, the annulus 302 may be filled with a hydrostatic column of fluid, and the modems 200 and 202 communicate through this hydrostatic column of fluid to communicate status and commands between the sea surface and the sea floor.

Figure 6:
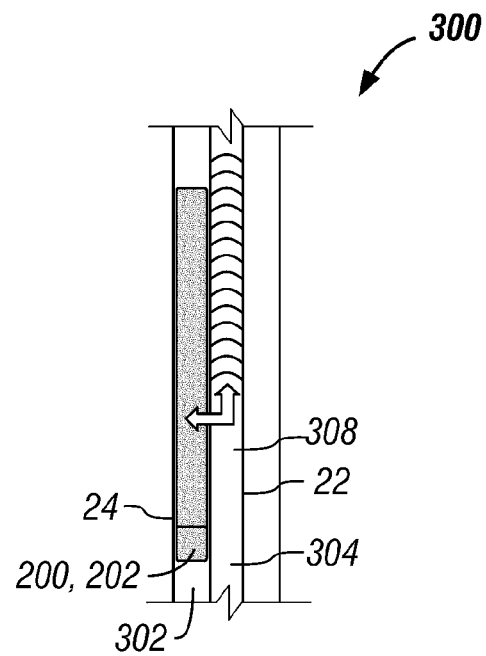

Alternatively, in another arrangement that is depicted in FIG. 6, each modem 200, 202 may be located inside the annulus 302 and attached to the outside of the landing string 22 for purposes of communicating acoustic signals through the well fluid inside a central passageway 308 of the landing string 22.

Figure 7:
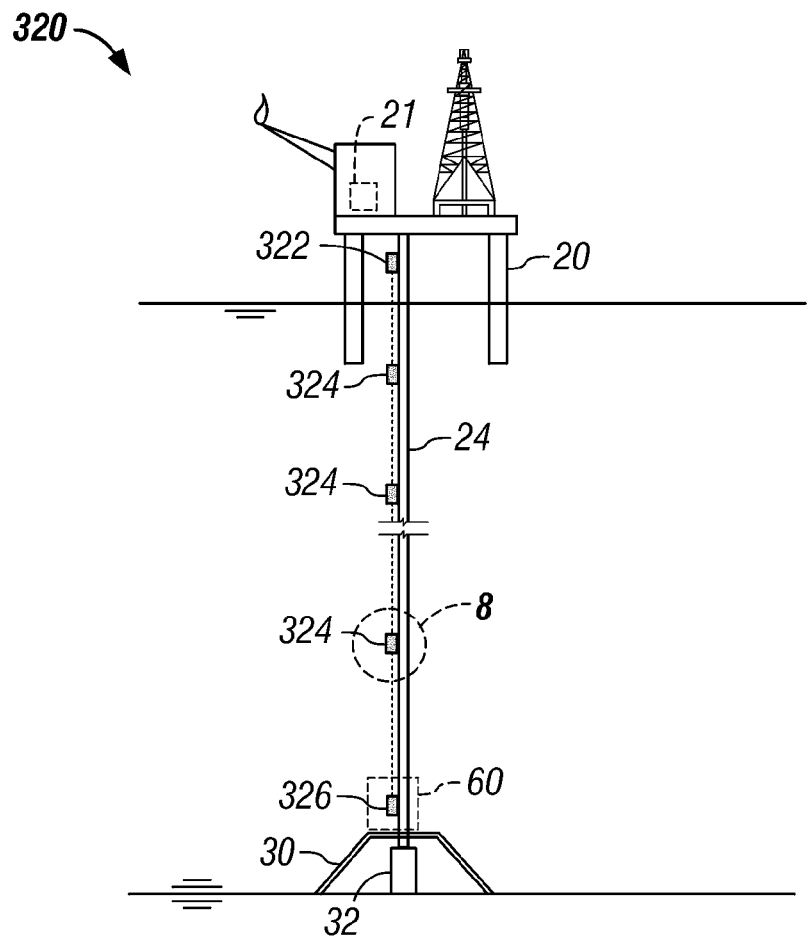
FIG. 7 is a schematic diagram of a laser communication system between subsea equipment and a surface platform.

Referring to FIG. 7, in another embodiment of the invention, optics may be used to establish a subsea communication system 320 that is depicted in FIG. 7. In this manner, in some embodiments of the invention, lasers may be used to establish optical communication between the sea floor and the sea surface. In these embodiments of the invention, the lasers use a long wavelength visible light, such as the light that is produced by a blue/green laser. More particularly, in some embodiments of the invention, in the system 320, the communication unit 60 may include a laser modem 326 that has the capability of transmitting a laser optical signal for reception by a corresponding laser modem 322 that is connected to the circuitry 21 at the vessel 20. Similarly, the communication may proceed in the opposite path, in that the laser modem 322 may transmit an optical signal that is communicated from the modem 322 to the laser modem 326.

Due to the significant depth of the well beneath the sea surface, the optical signal that is generated by the laser modem 322, 326 may become significantly attenuated by the seawater. Thus, in some embodiments of the invention, laser repeaters 324 are connected to the outside of the marine riser 24 to, as their name imply repeat the transmitted optical signal from one repeater to the next until the optical signal reaches the receiving modem. In these embodiments of the invention, the laser modems 326 and 322 are also connected to the outside of the marine riser 24.

Figure 8:
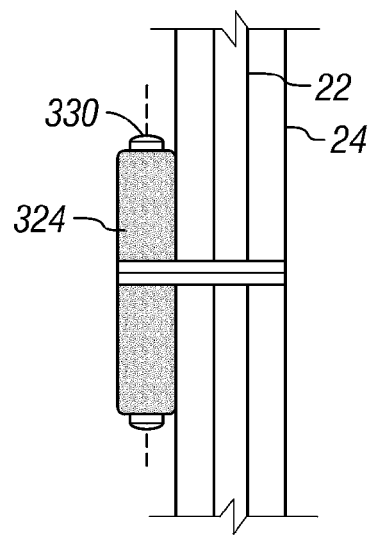
FIG. 8 is a more detailed schematic diagram of a laser repeater of the system depicted in FIG. 7.

Due to this arrangement, the bending of the marine riser 24 may continually change the line of site between each adjacent repeater 324/modem 322, 236. Therefore, to accommodate the bending of the marine riser 24, in some embodiments of the invention, a particular repeater 324 may have a design that is depicted in FIG. 8. More particularly, in some embodiments of the invention, each laser repeater 324 may have two steerable lens 330, one of which is located on each end of the repeater 324. Due to this arrangement, the laser repeater 324, for purposes of receiving an optical signal, steers the corresponding lens 330 toward the adjacent optical source (one of the laser modems or repeaters, for example) to optimize signal reception. Other variations are possible.

Figure 9:
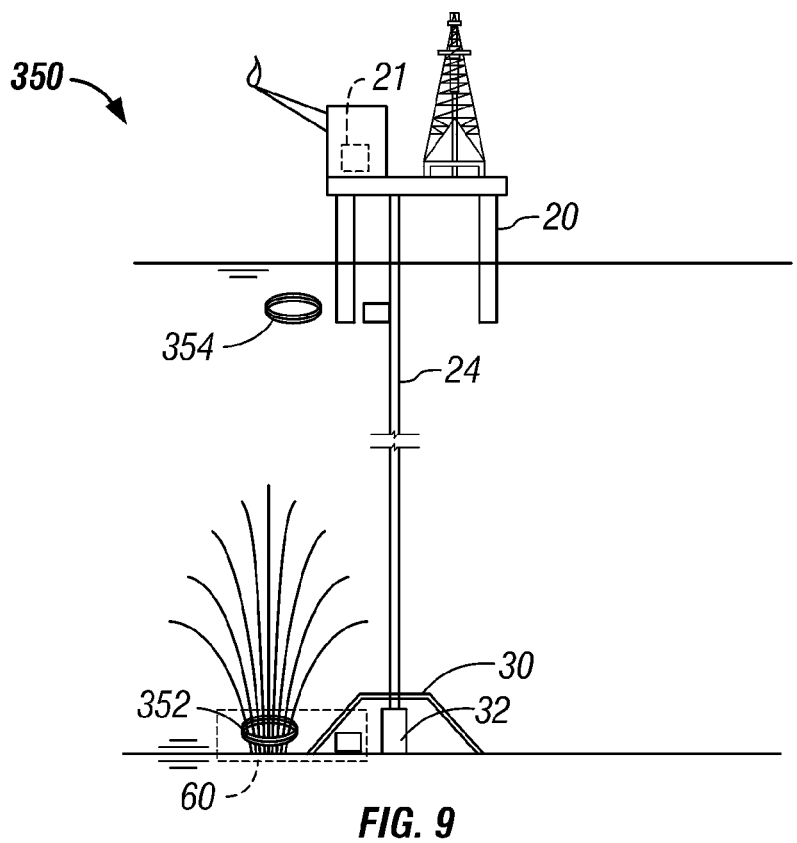
FIGS. 9 and 10 are schematic diagrams illustrating electromagnetic open sea communication systems to communicate between subsea equipment and a surface platform according to different embodiments of the invention.

FIG. 9 depicts an open seawater electromagnetic communication system 350 in accordance with an embodiment of the invention. In this manner, in this arrangement, the communication unit 60 is coupled to a transmit and receive aerial coil 352, and the circuitry 21 is coupled to an aerial, or coil 354. For purposes of communicating from the sea floor 50 to the sea surface or from the sea surface to the sea floor 50, a modulated signal is provided to the coil 352, 354 so that the coil 352, 354 radiates electromagnetic power. The induced signal propagates through the seawater, although the signal becomes more attenuated with distance from the transmitting source. The other coil 352, 354 receives the transmitted electromagnetic communication.

Figure 10:
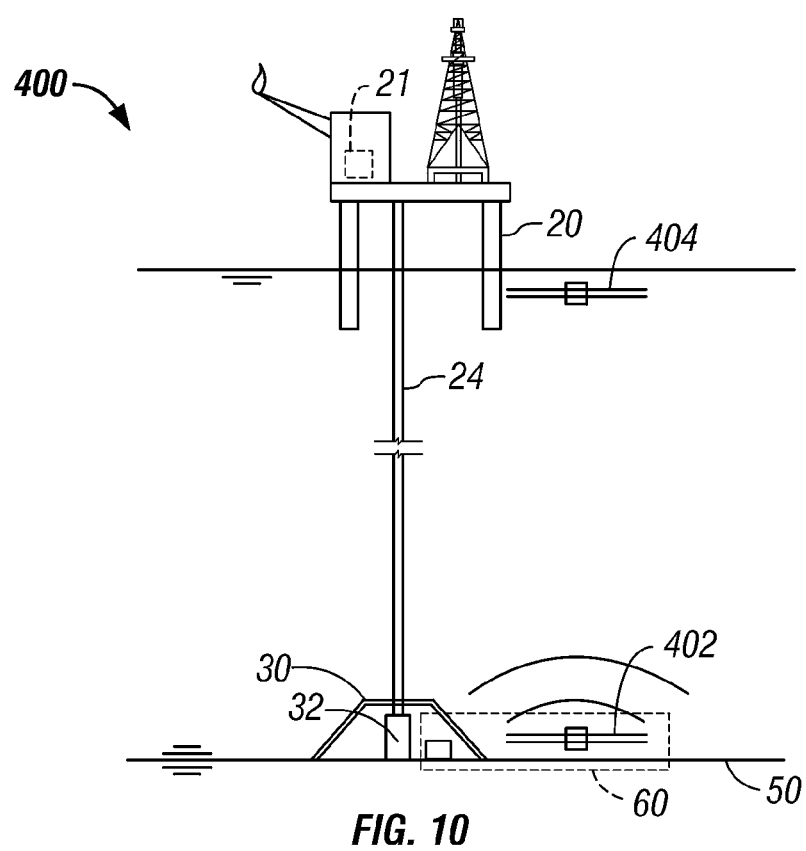

An alternative open seawater electromagnetic communication system 400 in accordance with another embodiment of the invention is depicted in FIG. 10. In this manner, in the system 400, electric dipoles 402 and 404 are substituted for the coils 352 and 354, respectively. In this manner, one electrical transmit and receive dipole 402 is coupled to the communication unit 30 near the sea floor 50, and another electrical transmit and receive dipole 404 is connected to the circuitry near the vessel 20. Both dipoles 402 and 404 may be used to transmit and receive via electromagnetic communication through the open seawater.

Figure 11:
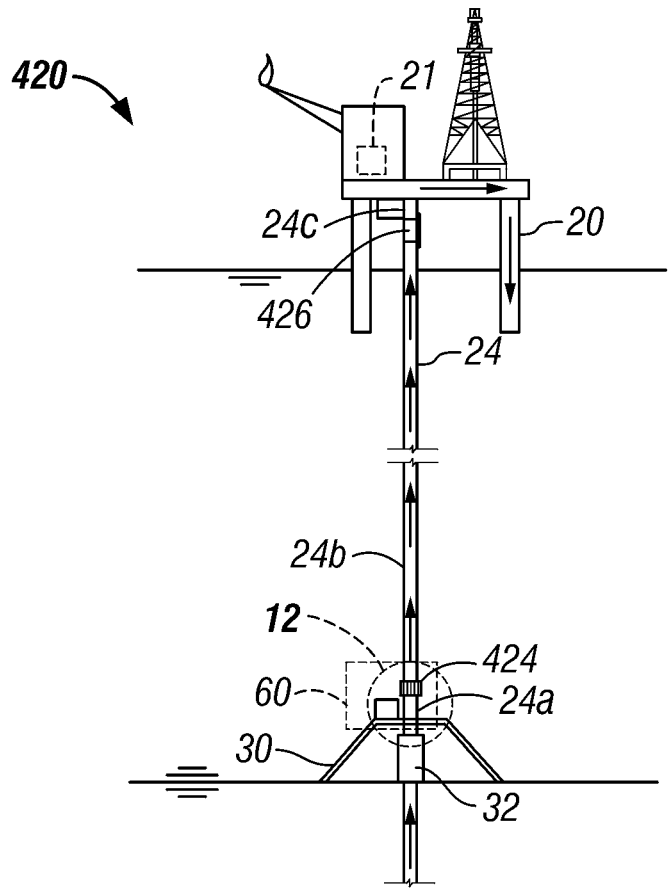
FIG. 11 is a schematic diagram of tubing-based electromagnetic communication system to communicate between subsea equipment and a surface platform according to an embodiment of the invention.

Referring to FIG. 11, a tubing-based electromagnetic communication system 420 may be used in some embodiments of the invention. In this system 420, umbilicalless electromagnetic communications occur between the communication unit 60 and the circuitry 21 via the landing string 22 or the marine riser 24. In this manner, such communication exploits the magnetic properties of the metal that is used in the riser 24 to propagate the transmitted signal between the sea floor 50 and the sea surface.

The system 420 includes a surface current transceiver 426 and a seabed current transceiver 424. In this manner, the transceiver 424, 426 furnishes current to the tubing (the marine riser 24 or landing string 22) when serving as a transmitter and receives current from the tubing when serving as a receiver in the communication system 420.

Figure 12:
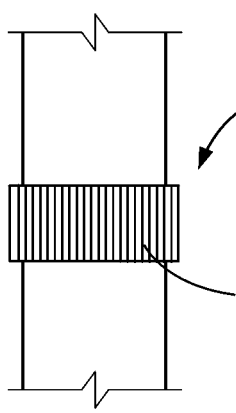
FIG. 12 is a schematic diagram of a toroid of the system of FIG. 11 according to an embodiment of the invention.
Figure 13:
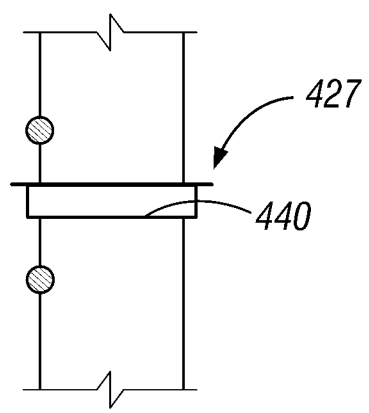
FIG. 13 is a schematic diagram of an isolation joint of the system of FIG. 11 according to an embodiment of the invention.

Referring to FIG. 12, in some embodiments of the invention, the transceiver 424, 426 may include a toroid 430, a device that, when used for purposes of transmission, is electrically driven at its terminals with a signal to produce the transmitted current in the tubing that extends through the center of the toroid 430 when used for purposes of receiving a signal, the terminals of the toroid 430 produce a voltage at its terminals in response to a current propagating through the tubing where the tubing extends through the center of the toroid. Referring to FIG. 13, in another embodiment, a particular transceiver 424, 426 may apply an electrical potential to a section of tubing and take advantage of isolation joints 440, electrically dielectric joints that are formed in the tubing.

Referring to FIGS. 11 and 13, as an example of an isolation joint 440, the marine riser 24 may be used as the medium for the current communication. Therefore, for this arrangement, the isolation joints 440 effectively subdivides the marine riser 24 into three sections: 24a, 24b and 24c and permits current communication along the middle segment 24b. Thus, the segments 24a and 24c are electrically coupled to the open seawater, and the communicated current propagates along the segment 24b.

Figure 14:
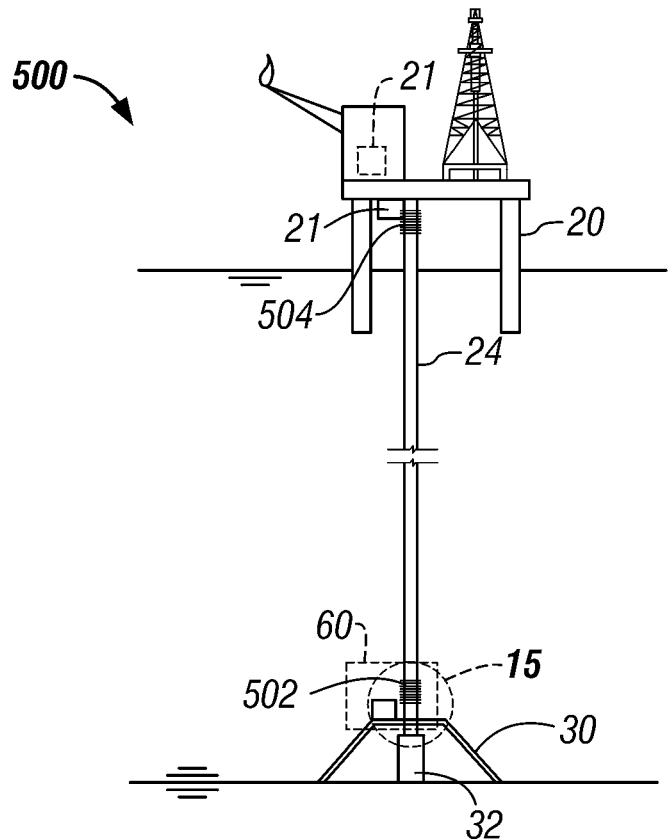
FIG. 14 is an illustration of a magnetic-based electromagnetic communication system to communicate between subsea equipment and a surface platform according to an embodiment of the invention.
Figure 15:
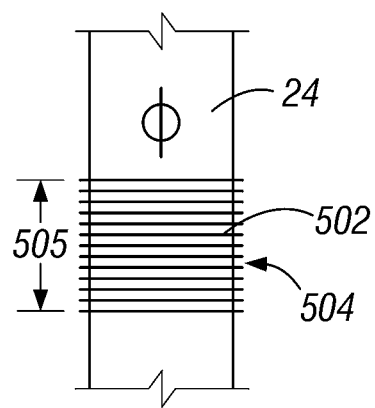
FIG. 15 is a schematic diagram of a coil of the system of FIG. 14 according to an embodiment of the invention.

Referring to FIG. 14, in another electromagnetic communication system 500, electromagnetic induction is used along the marine riser 24. In this manner, a coil 504 (see FIG. 15) is located near the vessel 60 and is coupled to the circuitry 21; and another coil 502 is coupled to the communication unit 60 and located near the sea floor 50. Both coils 502 and 504 include windings that extend around the marine riser 24 that passes through the center of each. Referring also to FIG. 15, the windings provide two terminals 505 that permit, for purposes of transmission, a magnetic flux to be generated by the application of voltage through the terminals 505. This flux then generates a voltage on the other coil 502, 504. Therefore, by either driving the coil 502, 504 or monitoring the terminals 505 of the coil 502, 504, electromagnetic induction-based communication may occur via the marine riser 24.

Figure 16:
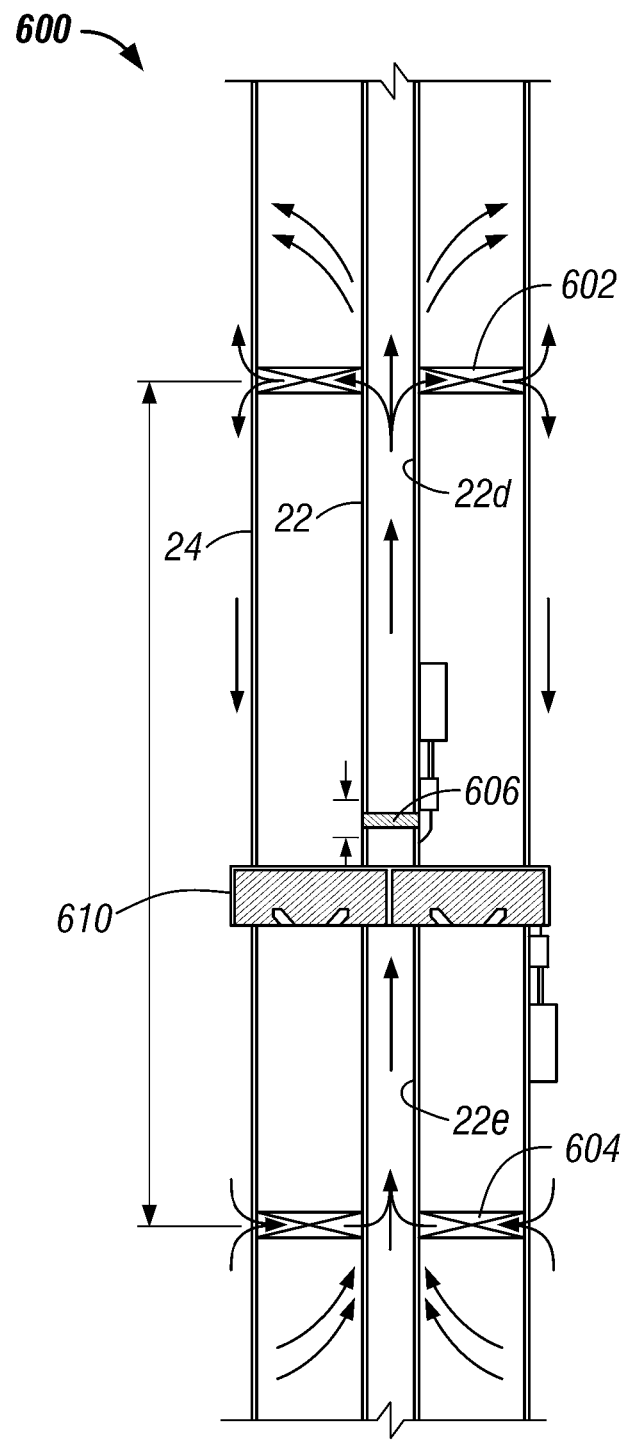
FIG. 16 is a schematic diagram of a more detailed embodiment of the system depicted in FIG. 11 according to an embodiment of the invention.

Other embodiments are within the scope of the following claims. For example, referring to FIG. 16, the electromagnetic communication through the marine riser 24 may be accomplished alternatively with a system 600. In the system 600, a toroid 610 is located near the sea floor 50 for purposes of receiving and transmitting signals to/from the communication unit 60. However, to facilitate communication of the current along the marine riser 24, it may be desirable to shunt the marine riser 24 and the landing string 22 together. In this manner, in the system 600, a conductive pad 602 is located between the landing string 22 and the marine riser 24 slightly above the toroid 610 that is associated with the communication unit 60. Between the connection pads 602 and the toroid 610, the landing string 22 includes an isolation joint 606, electrically dielectric joint that subdivides the landing string 22 into sections 22d and 22e. For purposes of transmission, the toroid 610 induces a current in the section 22d that, in turn, is shunted onto the marine riser 24 via the conductive pad 602. For purposes of receiving a current by the toroid 610, another conductive pad 604 is located beneath toroid 610 to shunt together the landing string 22 and the marine riser 24. In this manner, the shunt occurs in the section 22e of the landing string 22. Due to this shunting, current that is communicated down toward the seabed from the sea surface along the marine riser 24 is shunted into the section 22e of the landing string 22. This improves the signal and reception at the toroid 610. Other variations are possible.

Figure 17:
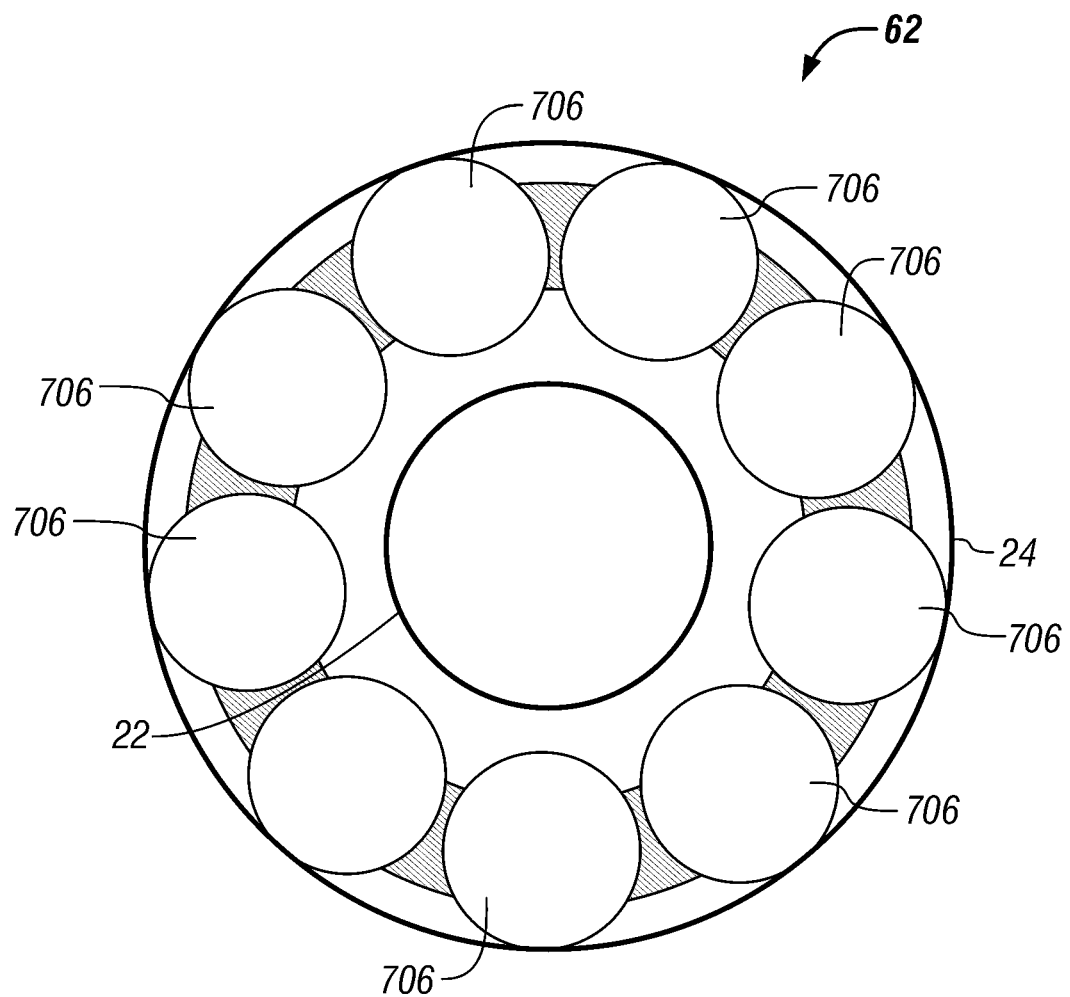
FIG. 17 is a cross-section of a hydraulic power unit of the system depicted in FIG. 1 according to an embodiment of the invention.

Referring to FIG. 17, in some embodiments of the invention, the hydraulic power unit 62 includes cylindrical chambers, or reservoirs 706, that are located in the annulus between the landing string 22 and the marine riser 24. In this manner, the access of each reservoir 706 is generally coaxial with the corresponding axes of the landing string 22 and marine riser 24. Furthermore, each reservoir 706 generally extends in a longitudinal direction along the marine riser 24 and landing string 22. The reservoirs 706 generally contain pumps to move the hydraulic system as well as service storage for storing the various hydraulic fluids. Furthermore, various pistons, or mandrels may be located inside a reservoir 706. Due to the location of these reservoirs 706 within the annulus, communication of production fluid through the landing string 22 is not inhibited. Furthermore, as depicted in FIG. 17, sufficient spacing is provided between the reservoirs 706 such that fluid communication through the annulus is also not inhibited. Other variations and arrangements for the hydraulic power unit 62 may be used.

While the present invention has been described with respect to a limited number of embodiments, those skilled in the art, having the benefit of this disclosure will appreciate numerous modifications and variations therefrom. It is intended that the appended claims cover all such modifications and variations as fall within the true spirit and scope of this present invention.

What is claimed is:

1. A system usable with a subsea well, the system comprising:
   a marine riser extending from a sea surface platform toward the subsea well;
   a flow path within the marine riser;
   a tubular string configured to be run through the marine riser from the surface of the sea to a position proximal to the sea bed;
   a tool;
   a hydraulic power subsystem connected to the tubular string and positioned within the marine riser to provide power to the tool;
   an umbilicalless power system to provide power to the hydraulic power subsystem;
   an umbilicalless communication system to establish communication between the position proximal to the surface of the sea and the position proximal to the sea bed to control the hydraulic power subsystem; and
   a first acoustic modem of the umbilicalless communication system located at the position proximal to the surface of the sea; and
   a second acoustic modem of the umbilicalless communication system located at the position proximal to the sea bed and connected to the hydraulic power system for receiving control instructions from the first acoustic modem and transmitting parameter data to the first acoustic modem,
   wherein the system does not include an umbilical cord, extending from the sea surface through the marine riser.

2. The system of claim 1, wherein at least one of the first and second moderns is positioned to transmit acoustic signals through an annulus inside the marine riser to perform the umbilicalless communication.

3. The system of claim 1, wherein at least one of the first and second moderns is positioned to communicate acoustic waves through a passageway of a production string to establish the umbilicalless communication.

4. The system of claim 1, wherein the tool is adapted to actuate a moveable member in response to a command communicated over the umbilicalless communication system.

5. The system of claim 4, wherein the tool that is provided power comprises a valve.

6. A method usable with a well, comprising:
   deploying a hydraulic power subsystem on a tubular string;
   running the tubular string with the hydraulic subsystem deployed thereon through a marine riser from the surface of the sea to a position proximal to the sea bed without running an umbilical cord through the marine riser, wherein the hydraulic power subsystem is adapted to provide power to a tool; and
   using an umbilicalless communication system to establish communication between a position proximal to the surface of the sea and the position proximal to the sea bed to control the hydraulic power subsystem for receiving control instructions at the position proximal to the sea bed from the position proximal the surface of the sea and for transmitting parameter data from the position proximal the sea bed to the position proximal the surface of the sea.

7. The method of claim 6, further comprising:
   providing the umbilicalless communication system, comprising providing a first acoustic modem located at the position proximal to the surface of the sea and providing a second acoustic modem located at the position proximal to the sea bed.

8. The method of claim 7, further comprising:
   using at least one of the first and second modems to transmit acoustic signals through an annulus inside the marine riser to perform the umbilicalless communication.

9. The method of claim 7, further comprising:
   using at least one of the first and second modems to communicate acoustic waves through a passageway of a production string to establish the umbilicalless communication.

10. The method of claim 6, further comprising:
    actuating a movable member of a tool in response to a command communicated over the umbilicalless communication system.

11. The method of claim 10, wherein the tool that is provided power comprises a valve.

12. The system of claim 1, wherein the umbilicalless communication system is adapted to establish wireless electromagnetic-based communication between the position proximal to the surface of the sea and the position proximal to the sea bed.

13. The method of claim 6, wherein the act of using the umbilical less communication system comprises communicating between the position proximal to the surface of the sea and the position proximal to the sea bed using wireless electromagnetic-based communication.

14. The system of claim 1, wherein at least one of the first and second modems is positioned to transmit acoustic signals through open sea to perform the umbilicalless communication.

15. The method of claim 7, further comprising:
    using at least one of the first and second modems to communicate acoustic waves through open sea to establish the umbilicalless communication.

16. The system of claim 1 further comprising an umbilicalless chemical injection unit to inject chemicals into the well.

* * * * *